(12) United States Patent
Abe et al.

(10) Patent No.: US 9,075,134 B2
(45) Date of Patent: Jul. 7, 2015

(54) RADAR SYSTEM

(71) Applicant: DENSO CORPORATION, Kariya, Aichi-pref. (JP)

(72) Inventors: Yoshihiro Abe, Kariya (JP); Akiyoshi Mizutani, Nagoya (JP)

(73) Assignee: DENSO CORPORATION, Kariya (JP)

( * ) Notice: Subject to any disclaimer, the term of this patent is extended or adjusted under 35 U.S.C. 154(b) by 338 days.

(21) Appl. No.: 13/711,943

(22) Filed: Dec. 12, 2012

(65) Prior Publication Data

US 2013/0147666 A1 Jun. 13, 2013

(30) Foreign Application Priority Data

Dec. 13, 2011 (JP) .................................. 2011-272475

(51) Int. Cl.
| | | |
|---|---|---|
| *G01S 13/42* | (2006.01) | |
| *G01S 13/06* | (2006.01) | |
| *G01S 3/74* | (2006.01) | |
| *G01S 7/35* | (2006.01) | |
| *G01S 13/34* | (2006.01) | |
| *G01S 13/58* | (2006.01) | |

(52) U.S. Cl.
CPC . *G01S 13/06* (2013.01); *G01S 3/74* (2013.01); *G01S 7/354* (2013.01); *G01S 13/345* (2013.01); *G01S 13/42* (2013.01); *G01S 13/584* (2013.01)

(58) Field of Classification Search
CPC ......... G01S 13/06; G01S 3/74; G01S 13/584; G01S 13/42; G01S 13/345; G01S 7/354
USPC .................................. 342/70–72, 95–97, 159
See application file for complete search history.

(56) References Cited

U.S. PATENT DOCUMENTS

| | | | | |
|---|---|---|---|---|
| 7,859,449 | B1 * | 12/2010 | Woodell et al. .................. 342/65 |
| 8,144,049 | B2 * | 3/2012 | Mizutani et al. ............. 342/147 |
| 8,289,203 | B2 * | 10/2012 | Culkin et al. ................... 342/73 |
| 2003/0210179 | A1 * | 11/2003 | Dizaji et al. .................. 342/159 |
| 2004/0178951 | A1 * | 9/2004 | Ponsford et al. .............. 342/192 |
| 2005/0052315 | A1 * | 3/2005 | Winterling et al. ........... 342/126 |

(Continued)

FOREIGN PATENT DOCUMENTS

| | | |
|---|---|---|
| JP | 11-166965 | 6/1999 |
| JP | 2006-047282 | 2/2006 |
| JP | 2006-208044 | 8/2006 |
| JP | 2011-038837 | 2/2011 |

OTHER PUBLICATIONS

Office action dated Oct. 15, 2013 in corresponding JP Application No. 2011-272475.

*Primary Examiner* — John B Sotomayor
(74) *Attorney, Agent, or Firm* — Harness, Dickey & Pierce, PLC

(57) ABSTRACT

A radar system for detecting positions of targets using a high resolution algorithm is presented. The number of incorrect target detections due to incorrect estimation of the number of radar reflections is reduced. A two-dimensional (azimuth and distance) peak having maximum power is detected, and a virtual beam formed centering on that peak. If that two-dimensional peak is buried in the virtual beam it is assumed to be a noise peak and removed. This is repeated for all two-dimensional peaks, thereby removing noise peaks and reducing the number of unnecessary target detections. The system can also correctly detect peaks that are close together at a certain resolution but have a power larger than the virtual beam.

10 Claims, 4 Drawing Sheets

(56) References Cited

U.S. PATENT DOCUMENTS

| | | |
|---|---|---|
| 2006/0007036 A1 | 1/2006 | Natsume et al. |
| 2012/0119940 A1* | 5/2012 | Mizutani et al. ............... 342/133 |
| 2012/0274499 A1* | 11/2012 | Chang ........................... 342/107 |
| 2013/0147666 A1* | 6/2013 | Abe et al. ....................... 342/451 |

* cited by examiner

FIG.4
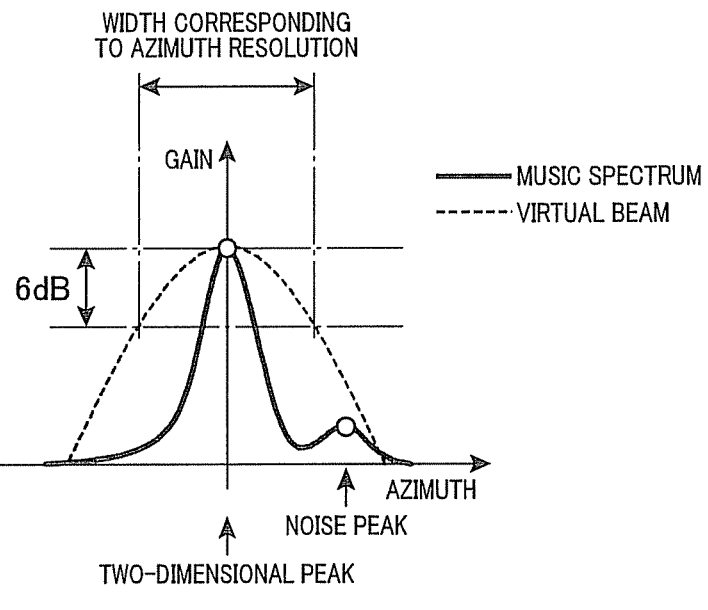
FIG.5
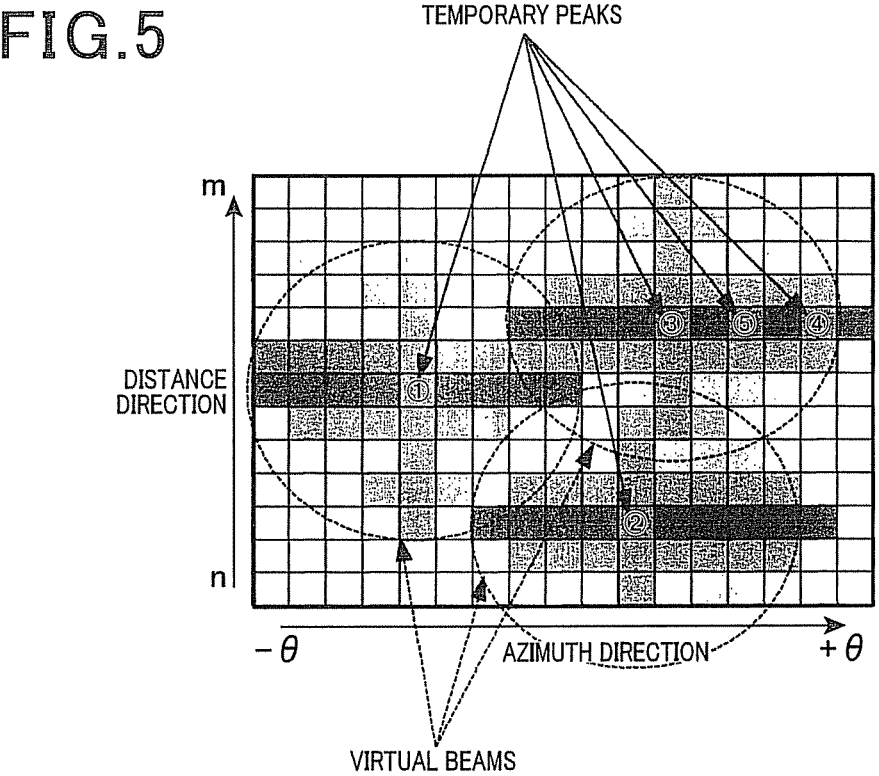
FIG.6
|  | CONVENTIONAL RADAR (USING MUSIC HIGH RESOLUTION ALGORITHM) | EXEMPLARY EMBODIMENT (MUSIC +VIRTUAL BEAMS) |
|---|---|---|
| FREQUENCY | 6.6% | 1.8% |

RADAR SYSTEM

CROSS-REFERENCE TO RELATED APPLICATION

This application is based on and claims the benefit of priority from earlier Japanese Patent Application No. 2011-272475 filed Dec. 13, 2011, the description of which is incorporated herein by reference.

BACKGROUND OF THE INVENTION

1. Technical Field of the Invention

The present invention relates to a radar system that detects the position of a target using a high-resolution algorithm.

2. Related Art

Some types of radar systems are well known. One type of well-known radar system uses array antennas composed of a plurality of antenna elements to detect the distance to a target that has reflected radio waves or the direction of arrival of radio waves (i.e. a direction in which the target is present).

As mentioned in JP-A-2006-047282, so-called high-resolution algorithms, such as MUSIC (Multiple Signal Classification), ESPRIT (Estimation of Signal Parameters via Rotational Invariance Techniques) and the like, are well known as methods of estimating the direction of arrival of radio waves. In a method using such a high-resolution algorithm, an angle spectrum is prepared according to a correlation matrix that shows correlation between signals received by antenna elements (also referred to as "channels"). Then, in the method, the angle spectrum is scanned to estimate the direction of arrival of radio waves.

In a high-resolution algorithm, an angle spectrum is prepared in a process of calculating the direction of arrival of radio waves. Specifically, in preparing an angle spectrum in the process, the number of reflections is estimated so that the estimated number of peaks is formed. Accordingly, if the estimated number of incoming waves is incorrect, unnecessary peaks (noise peaks) may be formed to unnecessarily detect a target that is not actually present (hereinafter this detection is referred to as "unnecessary detection"). An unnecessary detection may cause unnecessary control such as in an ACC (Adaptive Cruise Control) system of a vehicle. Therefore, the unnecessary detections have to be reduced as much as possible.

When a high-resolution algorithm is used, peaks are detected in the calculation with unnecessary fine resolution. Therefore, use of a high-resolution algorithm raises a problem of exposing noise peaks that would have been buried in peaks based on the waves reflected from a target in so-called Beam-former method.

On the other hand, as described in JP-A-2006-047282 as well, several attempts are made to enhance the accuracy of estimating the number of reflections. However, currently, sufficiently satisfactory results are not yet available.

SUMMARY

Accordingly, regarding a radar system for detecting the position of a target using a high-resolution algorithm, such a radar system that is able to reduce the occurring of unnecessary detections of targets due to an erroneous estimation of the number of incoming waves is desired.

Hence present application presents a following radar system as exemplary embodiment, of which includes: i) an electromagnetic wave transmitting means for transmitting electromagnetic waves; ii) an electromagnetic wave receiving means for receiving electromagnetic waves reflected from targets; iii) a position estimating means for estimating a position of each target that has reflected the electromagnetic waves, using at least a high resolution algorithm, according to reception signals acquired from the electromagnetic wave receiving means; iv) a virtual beam creating means for creating virtual beams having a predetermined beam width centering on respective targets' positions estimated by the position estimating means; and v) a removing means for removing the targets that are located within a range of the respective virtual beams and a received power with respect to the respective position is smaller than the power of the respective virtual beams (The first aspect of the radar system).

Accordingly, by means of the virtual beam, the first aspect of the radar system can remove the small power peak which appears in the vicinity of the peak regarding an angle spectrum, that is, can decrease unnecessary detection of nonexistent targets. Hence the present radar system can prevent causing unnecessary control of the vehicle.

It is preferable that a width of the virtual beam is just set to a value being able to gain a desired resolution (The second aspect of the radar system). According to the second aspect, the radar system can prevent over performance and offers a preferred detecting result to the downstream component for vehicle control.

It is preferable that the removing means processes the estimated targets in descending order of their power (The third aspect of the radar system). According to the third aspect, the processing load of the removing means can be reduced.

Though the position estimated by the estimating means may be a one-dimensional position represented by azimuth, a two-dimensional position represented by both distance and azimuth is more preferable (The fourth aspect of the radar system).

BRIEF DESCRIPTION OF THE DRAWINGS

In the accompanying drawings:

FIG. 4 is an explanatory diagram illustrating an outline of a virtual beam;

FIG. 5 is an explanatory diagram exemplifying positions of temporary peaks and gain distribution of virtual beams on a two-dimensional map expressed by distance and azimuth; and FIG. 6 is a table showing measurements of the effects of the radar sensor.

DETAILED DESCRIPTION OF THE PREFERRED EMBODIMENTS

Figure 1:
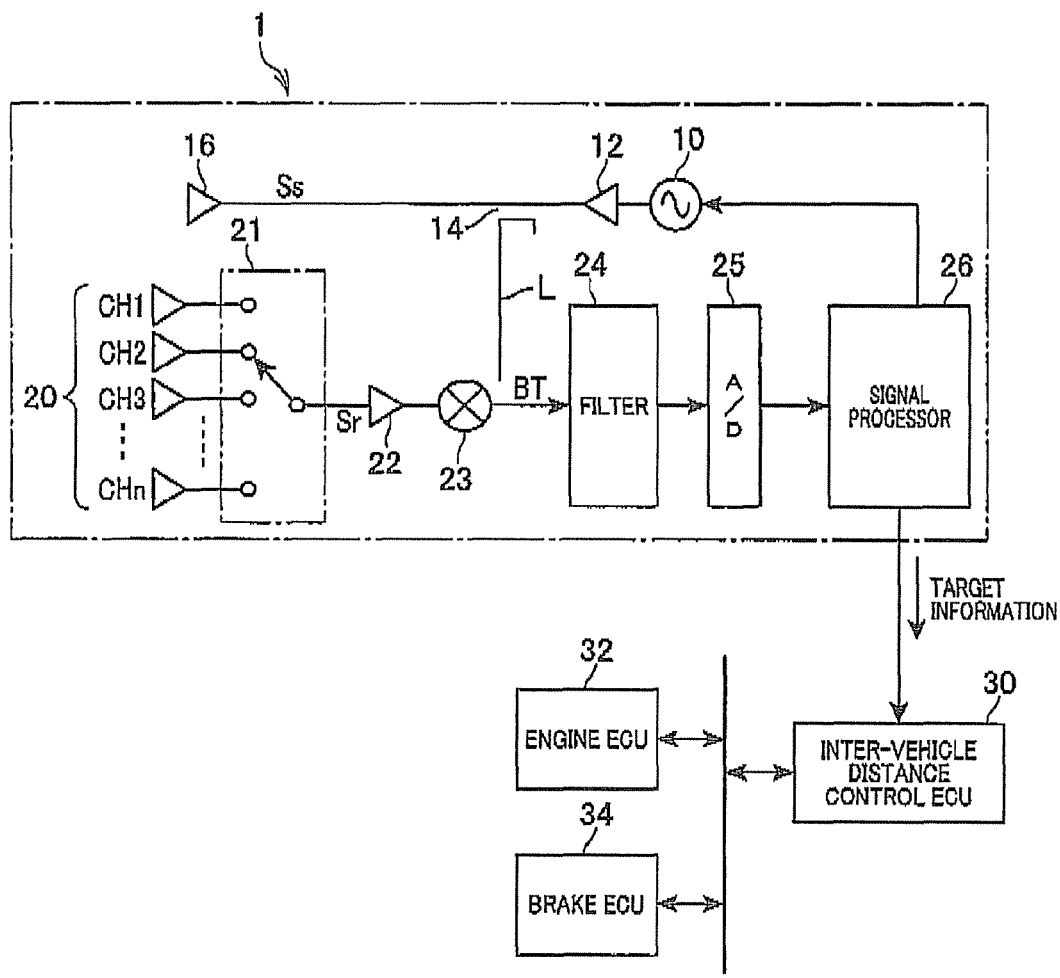
FIG. 1 is a block diagram illustrating a configuration of a radar sensor applied to an ACC system, according to the exemplary embodiment.

With reference to the accompanying drawings, hereinafter is described an embodiment of the present invention. FIG. 1 is a block diagram illustrating a configuration of a radar sensor (corresponding to the "radar system" recited in the claims) 1 applied to an ACC (Adaptive Cruise Control) system, according to the exemplary embodiment.

As shown in FIG. 1, the ACC system includes the radar sensor 1, an electronic control unit for inter-vehicle distance control (hereinafter referred to as an "inter-vehicle distance control ECU") 30: herein "inter-vehicle distance" means distance between the vehicles, an electronic control unit for engine (hereinafter referred to as an "engine ECU") 32 and an electronic control unit for brake (hereinafter referred to as a "brake ECU") 34. The radar sensor 1 detects conditions ahead of the vehicle. The inter-vehicle distance control ECU 30 automatically controls inter-vehicle distance according to the conditions ahead of the vehicle, which are detected by the radar sensor 1, and the conditions of the vehicle detected by various sensors, not shown. The engine ECU 32 controls the conditions of the engine according to a manipulated variable of the accelerator pedal or an instruction from the inter-vehicle distance control ECU 30. The brake ECU 34 controls the conditions of the braking device according to the state of manipulation of the brake pedal or an instruction from the inter-vehicle distance control ECU 30. The ECUs 30, 32 and 34 are each mainly configured by a well-known microcomputer and connected to each other via an on-vehicle LAN (Local Area Network).

The radar sensor 1 is configured as a so-called "millimeter-wave radar" based on an FMCW (Frequency-Modulated Continuous Wave) system. The radar sensor 1 transmits and receives frequency-modulated electromagnetic waves in a millimeter-wave band as radar waves to and from capture targets, such as preceding vehicles or roadside objects (hereinafter referred to as "captured targets"). The radar sensor 1 generates information regarding the captured targets (hereinafter referred to as "target information") and transmits the information to the inter-vehicle distance control ECU 30.

The target information at least includes positions (distance and azimuth) of the captured targets and relative velocity of the captured targets with respect to the vehicle equipped with the radar system (hereinafter also referred to as a "system-equipped vehicle").

[Configuration of the Radar Sensor]

The radar sensor 1 is specifically described below. The radar sensor 1 includes an oscillator 10, amplifier 12, distributor 14, transmission antenna 16 and reception antenna array 20. The oscillator 10 generates high-frequency signals of a millimeter-wave band. The high-frequency signals are modulated so as to have a section in which the frequency linearly increases with time (this section is hereinafter referred to as a "frequency-increase section") and a section in which the frequency linearly decreases with time (this section is hereinafter referred to as a "frequency-decrease section"). The amplifier 12 amplifies the high-frequency signals generated by the oscillator 10. The distributor 14 distributes power of the output from the amplifier 12 into transmission signals (Ss) and local signals (L). The transmission antenna 16 radiates radar waves according to the transmission signals (Ss). The reception antenna array 20 is composed of an n number of reception antenna elements (CH1 to CHn) that receive the radar waves.

The radar sensor 1 also includes a reception switch 21, amplifier 22, mixer 23, filter 24, A/D converter 25 and signal processor 26. The reception switch 21 sequentially selects any one of the antenna elements composing the reception antenna array 20 to supply reception signals (Sr) from the selected antenna element to a downstream component. The amplifier 22 amplifies the reception signals (Sr) supplied from the reception switch 21. The mixer 23 mixes the reception signals (Sr) amplified by the amplifier 22 with the local signals (L) to generate beat signals (BT). The filter 24 removes unnecessary signal components from the beat signals (BT) generated by the mixer 23. The A/D converter 25 samples the output from the filter 24 and converts the sampled output into digital data. The signal processor 26 activates or deactivates the oscillator 10, controls sampling of the beat signals (BT) performed via the A/D converter 25, processes the sampled data so as to generate target information or the like.

Hereinafter, the reception systems using the antenna elements CH1 to CHn composing the reception antenna array 20 are referred to as channels CH1 to CNn, respectively. The signal processor 26, which is mainly composed of a well-known microcomputer, includes a processing unit (e.g., DSP (Digital Signal Processor)). The processing unit has a function, for example, of performing Fast Fourier Transform (FFT) processing with respect to data acquired via the A/D converter 25.

[Operation of the Radar Sensor]

In the radar sensor 1 configured in this way, when the oscillator 10 is activated according to the instruction from the signal processor 26, the high-frequency signals generated in the oscillator 10 is transmitted to the amplifier 12 for amplification. Then, the output power of the amplified high-frequency signals is distributed by the distributor 14 into the transmission signals (Ss) and the local signals (L). Of these signals, the transmission signals (Ss) are transmitted as radar waves via the transmission antenna 16.

The radar waves emitted from the transmission antenna 16 and reflected from a target are received by the reception antenna elements composing the reception antenna array 20. In this case, only the reception signals (Sr) of a reception channel Chi (i=1 to n) selected by the reception switch 21 are supplied to the amplifier 22 for amplification. The reception signals (Sr) amplified by the amplifier 22 are supplied to the mixer 23. Then, the mixer 23 mixes the reception signals (Sr) with the local signals (L) from the distributor 14 to generate the beat signals (BT), i.e. frequency components equivalent to the difference between the signals (Ss) and the signals (Sr). The beat signals (BT) are subjected to filtering in the filter 24 to remove unnecessary signal components. Then, the filtered signals are sampled by the A/D converter and the sampled signals as digital data are supplied to the signal processor 26.

The reception switch 21 is ensured to switch the channels CH1 to CHn such that all of the channels CH1 to CHn are selected by a predetermined number of times during one modulation cycle of the radar waves. Further, the A/D converter 25 is ensured to perform sampling in synchronization with the switching timing. Specifically, during one modulation cycle of the radar waves, sampled data are stored for each of the channels CH1 to CHn and for each of the frequency-increase and frequency-decrease sections of the radar waves.

[Main Processing]

Figure 2:
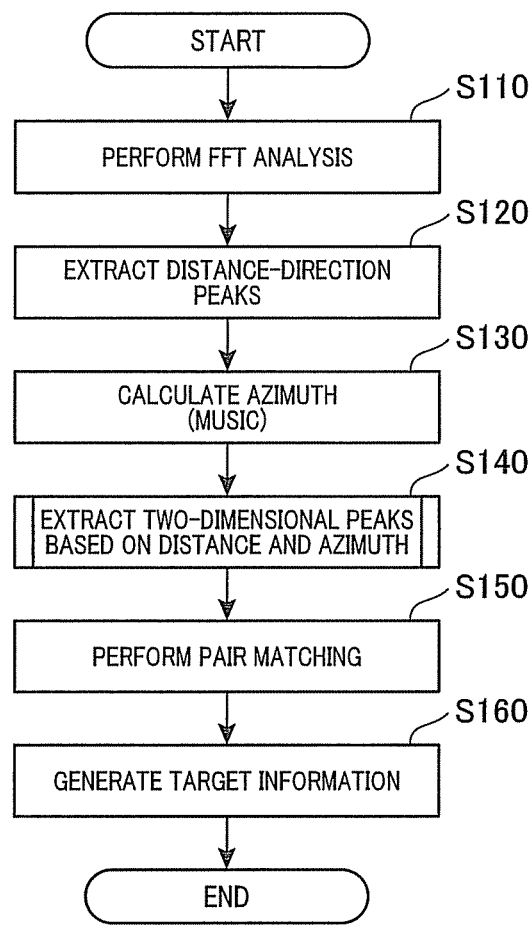
FIG. 2 is a flow diagram illustrating a processing performed by a signal processor in the radar sensor.

The main processing performed by the signal processor 26 is described along the flow diagram illustrated in FIG. 2. The main processing is repeatedly started on the basis of one modulation cycle of the radar waves as one measurement cycle.

When the main processing is started, frequency analysis (FFT processing here) is performed first, at step S110, for the sampled data corresponding to one modulation cycle stored during one measurement cycle. During the frequency analysis, the signal processor 26 calculates a power spectrum of the beat signals (BT) for each of the channels CH1 to CHn and for each of the frequency-increase and frequency-decrease sections of the radar waves.

Then, at step S120, the signal processor 26 searches through the power spectrum calculated at step S110 to extract frequency components as peaks (hereinafter referred to as "distance-direction peaks"). At step S130, the signal processor 26 performs azimuth calculation to obtain directions of arrival of the reflected waves that have caused the distance-direction peaks extracted at step S120, for each of the frequencies and for each of the modulation sections of the distance-direction peaks. Specifically, the signal processor 26 performs a high resolution algorithm, such as MUSIC, using the same distance-direction peaks simultaneously detected in the channels CH1 to CHn to obtain an angle spectrum.

At step S140, the signal processor 26 performs two-dimensional peak extraction. In the two-dimensional peak extraction, the signal processor 26 removes unnecessary noise peaks from the peaks (temporary peaks) whose positions are two-dimensionally expressed by the distance and azimuth obtained through steps S110 to S130, to extract peaks based on the waves reflected from the target (hereinafter referred to as "two-dimensional peaks").

At step S150, the signal processor 26 performs pair matching. In the pair matching, the signal processor 26 combines, among the two-dimensional peaks extracted at step S140 for every frequency-increase and frequency-decrease section, the peaks based on the waves reflected from the same target. Specifically, the signal processors 26 combines the two-dimensional peaks which coincide with each other in the signal levels of the distance-direction peaks as extracted at step S120 and in the directions of arrival as calculated at step S130.

At step S160, the signal processor 26 calculates a distance and a relative velocity for each of the combinations set at step S150, using a well-known process in an FMCW radar. Then, the signal processor 26 generates target information according to the calculated distance and relative velocity as well as the azimuth calculated at step S130 and then ends the main processing. The target information generated in the main processing is transmitted to the inter-vehicle distance control ECU 30 for use in ACC or the like.

[Two-Dimensional Peak Extraction]

Figure 3:
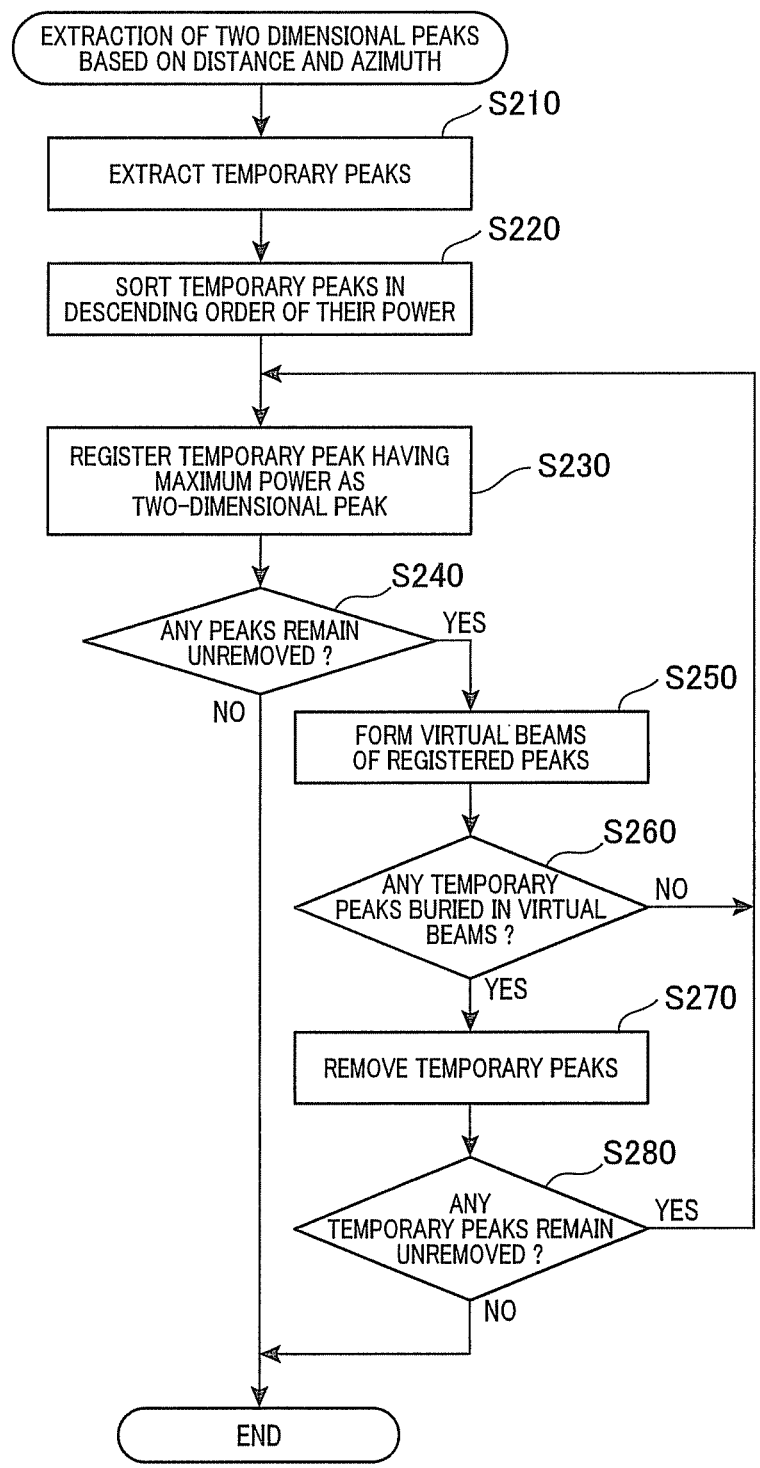
FIG. 3 is a flow diagram specifically illustrating a two-dimensional peak extraction performed in the processing.

The two-dimensional peak extraction is specifically described along the flow diagram shown in FIG. 3.

With the start of the two-dimensional peak extraction, the results obtained at step S130 (angle spectrum obtained through MUSIC) is subjected to peak scanning, at step S210, to thereby extract temporary peaks and prepare a list indicating two-dimensional positions and powers of the temporary peaks. The number of temporary peaks equals to the number of incoming waves, which has been estimated during the process of MUSIC.

Then, at step S220, the temporary peaks extracted at step S210 are sorted in descending order of their power. At step S230, among the temporary peaks, the one having a maximum power is registered as a two-dimensional peak and, at the same time, is removed from the list of the temporary peaks.

At step S240, it is determined whether or not any temporary peaks remain unremoved. If no temporary peaks remain unremoved (NO at step S240), the two-dimensional peak extraction is ended. On the other hand, if any temporary peak remains (YES at step S240), control proceeds to step S250. At step S250, virtual beams are created for the registered two-dimensional peaks. Then, at step S260, it is determined whether or not there are any temporary peaks buried in the virtual beams.

FIG. 4 is an explanatory diagram illustrating an outline of a virtual beam. As indicated by the broken line in FIG. 4, a virtual beam is created so as to have a beam shape (beam width) in which gain is lowered by 6 dB at a position distanced from the two-dimensional peak to be processed, by a half of a target azimuth resolution (or distance resolution). An expression "buried in a virtual beam" refers to the received power of the temporary peak not being more than the power of the virtual beam at the position. The diagram of FIG. 4 is based on only a relationship with azimuth. In the case of using a relationship with distance, the range of lowering by 6 dB is specified not by azimuth resolution but by range resolution. Otherwise, a relationship with distance is treated similar to a relationship with azimuth.

FIG. 5 is an explanatory diagram exemplifying positions of temporary peaks and gain distribution of virtual beams on a two-dimensional map expressed by distance and azimuth. Specifically, in FIG. 5, the positions of temporary peaks (shown by circled numerals 1 to 5 in a descending order of the power of the peaks) are shown on the two-dimensional map expressed by distance and azimuth. Also, for the temporary peaks having the three highest powers, the gain distribution of virtual beams is shown in the map by grayscale. The gain distribution of each virtual beam appears, for example, as shown in FIG. 5.

If no temporary peaks are buried in the virtual beams (NO at step S260), control returns to step S230 to repeat steps S230 to S260. If any peaks are buried in the virtual beams (YES at step S260), control proceeds to step S270. At step S270, the temporary peaks buried in the virtual beams are determined to be the peaks originated from noise and removed.

At step S280, it is determined whether or not there are temporary peaks that remain without being removed. If any temporary peaks remain unremoved (YES at step S280), control returns to step S230 to repeat steps S230 to S280. If no temporary peaks remain unremoved (NO at step S280), i.e. if all of the temporary peaks have been processed, the two-dimensional peak extraction is ended.

Advantages

As described above, in the radar sensor 1, the temporary peak having the maximum power is registered as a two-dimensional peak. Then, a virtual beam is formed centering on the position of the two-dimensional peak. Then, the temporary peak, if it is buried in the virtual beam, is removed as a noise peak. The same process is repeatedly performed for the temporary peaks remaining without being removed, thereby ensuring extraction of two-dimensional peaks.

Thus, the radar sensor 1 is able to remove noise peaks in the event that the noise peaks are caused in the vicinity of the two-dimensional peaks, and thereby avoid erroneously estimating the number of reflections to be larger than the actual number. Accordingly, the radar sensor 1 is able to prevent unnecessary detections.

Further the radar sensor 1 is able to individually and separately detect a peak having a larger power than that of the virtual beam, in the event that the peaks are located close to each other with respect to a required resolution.

FIG. 6 is a table showing measurements of the effects of the radar sensor 1. Specifically, the table of FIG. 6 shows measurements of the frequency of unnecessary detections performed by a radar (using high resolution algorithm (Music)) of conventional art and by the radar sensor 1 of the present embodiment (using combination of high-resolution algorithm and virtual beams). The measurements are based on a scenario that a certain vehicle running on the adjacent lane passes the system-equipped vehicle. As shown in the table, the radar sensor 1 of the present embodiment has been confirmed to reduce the number of unnecessary detections to ⅓ to ¼ of those of the radar of conventional art.

In the present embodiment, the components other than the signal processor 26 of the radar sensor 1 correspond to the electromagnetic transmitting/receiving means; the signal processor 26 that performs steps S120 to S130 corresponds to the position estimating means; the signal processor 26 that performs steps S250 corresponds to the virtual beam creating means; and the signal processor 26 that performs steps S260 to S270 corresponds to the removing means.

[Modifications]

An embodiment of the present invention has been described so far. However, the present invention is not limited to the above embodiment but may be implemented in various modifications in a range not departing from the spirit of the present invention.

The embodiment described above exemplifies that the radar sensor 1 is applied to an ACC system. However, this should not impose a limitation. Further, as an alternative to MUSIC as a high-resolution algorithm used in azimuth detection in the above embodiment, ESPRIT or other algorithms may be used.

In the embodiment described above, virtual beams are applied to the temporary peaks whose positions are two-dimensionally expressed by distance and azimuth. Alternative to this, virtual beams may be applied to the peaks whose positions are one-dimensionally expressed (i.e., only by either azimuth or distance) as a result of using a high-resolution algorithm.

What is claimed is:

1. A radar system comprising:
   means for transmitting electromagnetic waves;
   means for receiving electromagnetic waves reflected from targets;
   means for estimating a position of each target that has reflected the electromagnetic waves, using a high-resolution algorithm, according to received signals acquired from the receiving means;
   means for creating virtual beams having a predetermined beam width centering on respective targets' positions estimated by the estimating means; and
   means for removing targets that are located within a range of the respective virtual beams and have a received power with respect to the respective target's position that is smaller than a received power of the respective virtual beams.

2. The radar system according to claim 1, wherein:
   the estimating means, the creating means, and the removing means are configured by a signal processor; and
   the signal processor is configured to set a width of the virtual beam to a value corresponding to a desired resolution.

3. The radar system according to claim 2, wherein the signal processer is further configured to process the estimated targets in descending order of their power.

4. The radar system according to claim 3, wherein the signal processer is further configured to estimate, as the position, a two-dimensional position which is defined by both azimuth and distance.

5. The radar system according to claim 1, wherein:
   the estimating means, the creating means, and the removing means are configured by a signal processor; and
   the signal processor is configured to process the estimated targets in descending order of their power.

6. The radar system according to claim 1, wherein:
   the estimating means, the creating means, and the removing means are configured by a signal processor; and
   the signal processor is configured to estimate, as the position, a two-dimensional position which is defined by both azimuth and distance.

7. The radar system according to claim 2, wherein the signal processer is further configured to estimate, as the position, a two-dimensional position which is defined by both azimuth and distance.

8. The radar system according to claim 1, wherein:
   the signal processor is configured to extract temporary peaks and prepare a list indicating two-dimensional positions and powers of each of the temporary peaks;
   the signal processor is configured to sort the temporary peaks in descending order of their power and register a temporary peak having a maximum power as a two-dimensional peak.

9. The radar system according to claim 8, wherein the creating means centers one of the virtual beams on the two-dimensional peak.

10. The radar system according to claim 9, wherein:
    the signal processor is configured to determine if there is at least one temporary peak buried in the one of the virtual beams; and
    the signal processor is configured to remove the at least one temporary peak buried in the one of the virtual beams from the list.

* * * * *